United States Patent [19]
Gregg, Jr.

[11] Patent Number: 4,692,763
[45] Date of Patent: Sep. 8, 1987

[54] BINAURAL DOPPLER RADAR TARGET DETECTOR

[75] Inventor: Ralph C. Gregg, Jr., Tempe, Ariz.

[73] Assignee: Motorola, Inc., Schaumberg, Ill.

[21] Appl. No.: 812,601

[22] Filed: Dec. 23, 1985

[51] Int. Cl.$^4$ .......................................... G01S 13/56
[52] U.S. Cl. ...................................... 342/28; 342/114
[58] Field of Search ........................... 342/24, 28, 114

[56] References Cited

U.S. PATENT DOCUMENTS

| | | | |
|---|---|---|---|
| 3,172,075 | 3/1965 | Kay | 342/24 X |
| 3,383,682 | 5/1968 | Stephens, Jr. | 342/24 |
| 3,422,430 | 1/1969 | Rittenbach | 342/114 |
| 3,568,188 | 3/1971 | Fishbein et al. | 342/114 X |
| 3,611,372 | 10/1971 | Fishbein | 342/114 X |
| 3,742,501 | 6/1973 | Urkowitz et al. | 342/114 |
| 3,845,461 | 10/1974 | Foreman | 342/28 X |
| 3,882,495 | 5/1975 | Bolger | 342/28 X |
| 4,499,467 | 2/1985 | Rittenbach | 342/114 X |

Primary Examiner—T. H. Tubbesing
Attorney, Agent, or Firm—Lowell W. Gresham

[57] ABSTRACT

Audio frequency Doppler signals output from a radar are encoded and presented to left and right speakers of a headset. The Doppler signals are encoded so that the auditory effect produced by sounds emanating from the left and right speakers are perceived by an operator as originating from a particular location in space. In a preferred embodiment in-phase and quadrature Doppler signal outputs from a coherent radar couple through an optional phase shift to the left and right speakers. Sounds having phase differences dependent upon whether a target is approaching or receding result. The operator hears these sounds and perceives the sounds as being located toward the left or right.

19 Claims, 2 Drawing Figures

BINAURAL DOPPLER RADAR TARGET DETECTOR

BACKGROUND OF THE INVENTION

This invention relates generally to electronic devices utilized in radar systems. Specifically, this invention relates to Doppler radars which utilize audio indicators in communicating information to human radar operators.

Existing Doppler radar target detectors provide an audio signal to a target detector operator as a means of communicating information about objects or targets illuminated by the radar. For example, the target detector may generate a tone which corresponds to the target. When the target approaches the target detector, the tone exhibits a pitch higher than the pitch of a reference tone. Conversely, when the target recedes from the target detector, the tone exhibits a lower pitch than that exhibited by the reference tone. Further, the greater the speed of the target toward or away from the target detector, the greater the difference in pitch between the target's tone and the reference tone. Accordingly, the target detector operator knows whether a target is approaching or receding and an approximate speed of the target by listening to the target's tone and the reference tone.

Additionally, such target detectors provide the target detector operator information useful in identifying the target. Information about the target's speed along with short time interval changes in the pitch and amplitude of the target's tone give the target detector operator an indication of the type of object which the target represents. For example, the target tone produced from a walking person may sound like a "whish" while the tone produced from a moving vehicle may sound like a "whirl."

Accordingly, a target detector operator confronts a large quantity of audio information in the process of operating the target detector. The audio stimulation is very demanding on the concentration of the operator. Perceptual saturation and fatigue may quickly occur. Resultingly, poor performance occurs in the operation of the target detector due to the demands placed upon the operator.

Additionally, such target detectors are susceptible to electronic jamming signals. With great demands placed on the operator's concentration, the operator is easily deceived by jamming signals which simulate valid radar reflections.

SUMMARY OF THE INVENTION

Accordingly, it is an object of the present invention to provide an improved Doppler radar target detector which adds the variable of spatial location of the sounds which the target detector produces to pitch and amplitude information. By originating a target's tone from locations in space which possess a relationship to the speed and direction information, the demands on the operator's concentration lessen with a result of improved performance.

Another object of the present invention concerns providing an improved Doppler radar target detector which shows improved performance in the presence of jamming.

Yet another object of the present invention concerns providing an improved Doppler radar target detector which can be implemented using a minimum amount of hardware so that it readily adapts to existing portable radars.

The above and other objects and advantages of the present invention are carried out in one form by a target detector which includes a radar having a Doppler signal output, a localizer, a left speaker, and a right speaker. The localizer couples to an output of the radar, and the left and right speakers couple to left and right outputs, respectively, of the localizer. The localizer produces left and right audio signals from the Doppler signal. The left and right audio signals produce left and right sounds at the left and right speakers, respectively. When a target detector operator hears the left and right sounds at the operator's left and right ears, respectively, the sounds when considered together are perceivable by the operator as originating from a particular location which has a known relationship to the Doppler signal.

BRIEF DESCRIPTION OF THE DRAWINGS

A more complete understanding of the present invention may be derived by reference to the detailed description and the claims when considered in connection with the accompanying drawings, in which like reference numbers indicate similar parts, and wherein:

DETAILED DESCRIPTION OF THE PREFERRED EMBODIMENT

Figure 1:
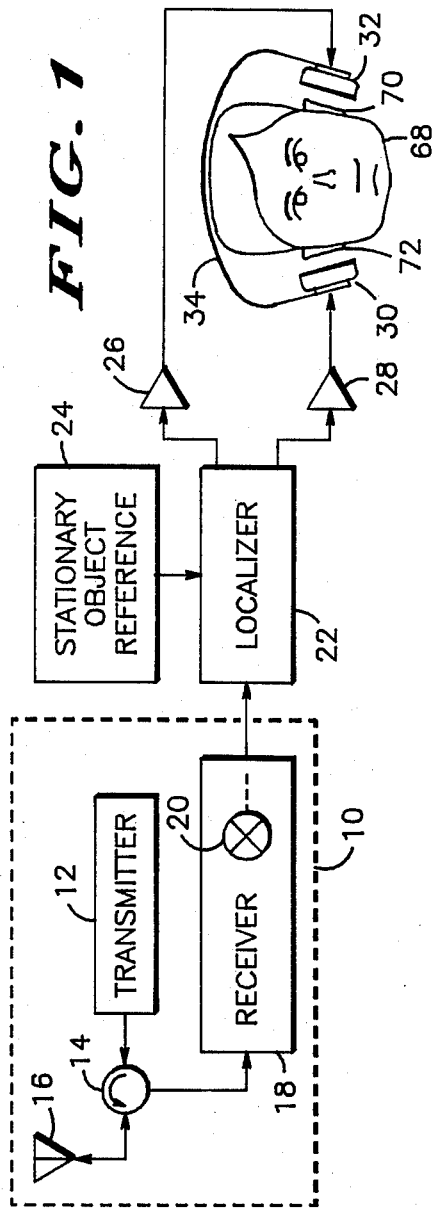
FIG. 1 shows a basic block diagram of the present invention.

FIG. 1 shows a block diagram which illustrates the basic operation of the present invention. In FIG. 1 a radar 10 includes a transmitter 12, a duplexer 14, an antenna 16, and a receiver 18. Transmitter 12 has an output which couples to a first port of duplexer 14. A second port of duplexer 14 couples to antenna 16, and a third port of duplexer 14 couples to an input of receiver 18.

Transmitter 12 generates a transmit signal which couples through duplexer 14 to antenna 16. The transmit signal then radiates from antenna 16 and propagates until it illuminates an object or target (not shown). A portion of the transmit signal which illuminates the target reflects back to antenna 16 as a reflected signal. The reflected signal then couples through duplexer 14 and enters receiver 18.

Receiver 18 includes at least one mixer 20 which aids in down-converting the received signal into a Doppler signal at an output of receiver 18. The Doppler signal exhibits a frequency in the audio range, preferably from 100 to 3000 Hz. The precise frequency exhibited by the Doppler signal depends on movement of the target. Target movement toward radar 10 causes the Doppler signal to exhibit a higher frequency relative to frequencies which result from target movement away from radar 10. Additionally, faster target speeds toward radar 10 cause the Doppler signal to exhibit a higher frequency relative to frequencies which result from slower target speeds toward radar 10; and, faster target speeds away from radar 10 causes the Doppler signal to exhibit a lower frequency relative to frequencies which result from slower target speeds away from radar 10.

Consequently, a zero-Doppler frequency may be exhibited by the Doppler signal. The zero-Doppler frequency represents the frequency exhibited by the Doppler signal when the target remains stationary while being illuminated by the transmit signal. The zero-Doppler frequency is less than frequencies exhibited by the Doppler signal when the target approaches radar 10 and greater than frequencies exhibited by the Doppler signal as a result of a receding target. Further, the zero-Doppler frequency is predetermined by the construction of receiver 18.

Receiver 18 provides the Doppler signal at its output, which also represents an output of radar 10. The output of radar 10 couples to an input of a localizer 22. Localizer 22 has a left output which couples to an input of an audio frequency amplifier 26 and a right output which couples to an input of an audio frequency amplifier 28. An output of amplifier 26 couples to a left speaker 32 of a headset 34, and an output of amplifier 28 couples to a right speaker 30 of headset 34.

Localizer 22 encodes the Doppler signal into left and right audio signals at its left and right outputs, respectively. Amplifiers 26 and 28 amplify the left and right audio signals, respectively. The left and right audio signals then energize left and right speakers 32 and 30 causing a left sound and a right sound, respectively. A human target detector operator 68 listens to the left sound at a left ear 70 of operator 68 and to the right sound at a right ear 72 of operator 68. Accordingly, localizer 22 encodes the Doppler signal so that the left sound and the right sound heard at left ear 70 and right ear 72, respectively, of operator 68 cause operator 68 to perceive the combined sound as originating from a particular location relative to left and right ears 70 and 72 of operator 68.

Psychological experiments have revealed that humans utilize several different mechanisms for locating the origin in space of various sounds without visual clues to the sound source. With one mechanism a person recognizes a difference in loudness between sounds heard at the person's left and right ears. Sound intensity, or loudness, diminishes as the square of the distance between left and right ears and as a result of a sound shadow cast by the person's head. Consequently, when a person's right ear hears a sound at a slightly greater loudness than the person's left ear hears substantially the same sound, the person perceives the sound as originating from a place in space which is to the person's right.

Time delays represent another mechanism which people use to locate the origin of a sound without a visual clue to the sound's source. A sound emanating from a sound source on a person's left side will arrive at the person's left ear before it reaches the person's right ear. Thus, a time delay results which provides the person with a clue as to the location of the sound source.

A phase difference between the sound received at a person's left and right ears represents yet another mechanism people use to locate sounds. Accordingly, a person perceives a sound as originating from a direction associated with the ear that hears the leading phase sound signal.

Localizer 22 may exploit one or more of the loudness, delay, and phasing mechanisms to cause operator 68 to perceive the sound as originating from a particular location. For example, one embodiment of the present invention utilizes a stationary object reference 24 which couples to localizer 22. Reference 24 provides a signal with a parameter that exhibits a value having a predetermined relationship to the zero-Doppler frequency of the Doppler signal. For example, reference 24 may provide a signal exhibiting the zero-Doppler frequency.

Then, by comparing the frequencies of the Doppler signal and reference signal, localizer 22 determines whether the target is approaching or receding. Localizer 22 couples the Doppler signal for approaching targets to either one of left speaker 32 and right speaker 30 while coupling the Doppler signal for receding targets to the other one of left speaker 32 and right speaker 30. Additionally, localizer 22 may advantageously present the Doppler signal to the non-selected one of speakers 32 and 30 at a reduced amplitude, wherein the amount of amplitude reduction corresponds to the frequency difference between the Doppler signal and the reference signal. Information concerning the target's speed results. Faster objects provide a greater difference in loudness between sounds produced by left and right speakers 32 and 30, respectively. Thus, localizer 22 in this embodiment exploits the loudness mechanism for localizing sounds.

In addition to or in lieu of the loudness mechanism, localizer 22 may advantageously exploit the time delay mechanism. For example, another embodiment of the present invention may utilize a localizer 22 which compares the reference signal received from reference 24 with the Doppler signal. Such a localizer 22 then couples the Doppler signal to the left and right outputs of localizer 22 through a variable delay element. The results from the comparison control the amount of delay experienced by the Doppler signal in route to the left and right outputs of localizer 22. For example, a Doppler signal routed to the right output of localizer 22 experiences a maximum delay, and a Doppler signal routed to the left output of localizer 22 experiences no delay, when a maximum frequency Doppler signal is presented to localizer 22. Further, a Doppler signal routed to the left output of localizer 22 experiences a maximum delay, and a Doppler signal routed to the right output of localizer 22 experiences no delay, when a minimum frequency Doppler signal is presented to the input of localizer 22. Additionally, the Doppler signals routed to the left and right outputs of localizer 22 may experience equal delays when Doppler signals exhibiting the zero-Doppler frequency are input to localizer 22.

Figure 2:
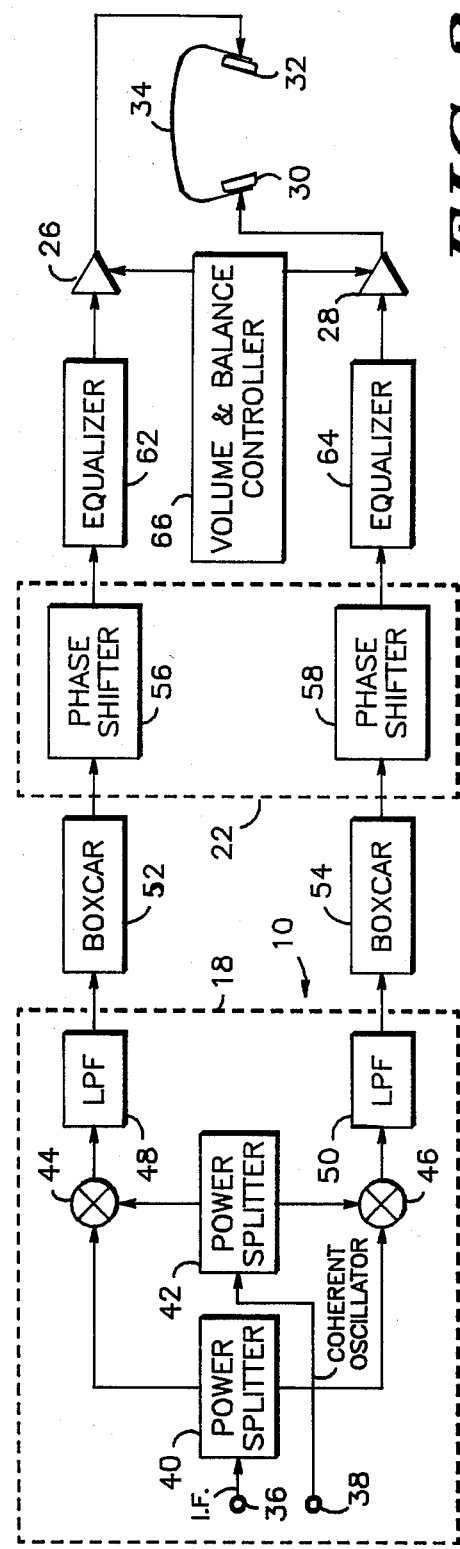
FIG. 2 shows a block diagram of a particular embodiment of the present invention.

Alternatively, localizer 22 may exploit the phasing mechanism discussed above and thereby cause operator 68 to perceive sounds emitting from speakers 30 and 32 as originating from a particular location. The phasing technique may be used in addition to or in lieu of the time delay and loudness techniques mentioned above. FIG. 2 shows one particular embodiment which exploits the phasing mechanism.

The FIG. 2 embodiment of the present invention includes a receiver 18 from a coherent radar 10. A terminal 36 supplies an IF radar signal which is derived from the reflected signal of an illuminated target. Terminal 36 couples to an input of an in-phase power splitter 40. A first output of power splitter 40 couples to a first input of a mixer 44, and a second output of power splitter 40 couples to a first input of a mixer 46. A terminal 38 supplies a coherent oscillator signal and couples to a quadrature power splitter 42. A first output of quadrature power splitter 42 couples to a second input of mixer 44, and a second output of quadrature power splitter 42 couples to a second input of mixer 46. An output of mixer 44 couples to an input of a low pass filter 48, and an output of mixer 46 couples to an input of a low pass filter 50.

Those skilled in the radar arts will recognize that receiver 18 shown in FIG. 2 shows only the output portion of a conventional coherent radar. The IF radar signal applied at terminal 36 represents a return signal which has been reflected from a target illuminated by a transmit signal. The return signal splits into two sub-return signals which exhibit substantially equal amplitudes and phase at the outputs of power splitter 40. The coherent oscillator signal applied at terminal 38 exhibits coherency with the return signal because the coherent oscillator signal also generates the transmit signal radiated from radar 10. The coherent oscillator signal splits into an in-phase COHO signal at the first output of quadrature power splitter 42 and a quadrature COHO signal at the second output of quadrature power splitter 42. The in-phase and quadrature COHO signals exhibit substantially similar amplitudes but 90° of relative phase shift.

Mixers 44 and 46 provide an in-phase baseband signal and a quadrature baseband signal at their respective outputs. The baseband signals exhibit substantially equal amplitudes and 90° of relative phase difference. Low pass filters 48 and 50 remove frequency components above the audio frequency band from the baseband signals and provide an in-phase Doppler signal and a quadrature Doppler signal, respectively as the output signals from radar 10.

In the present embodiment a boxcar filter 52 has an input coupled to the output of low pass filter 48, and a boxcar filter 54 has an input coupled to the output of low pass filter 50. Radar 10 represents a pulsed radar in the present embodiment. Thus, the Doppler signals output from radar 10 are pulsed signals. Boxcar filters 52 and 54 convert the pulsed Doppler signals at the outputs of low pass filters 48 and 50, respectively, into continuous wave Doppler signals at outputs of boxcar filters 52 and 54. However, those skilled in the radar arts will recognize that boxcar filters 52 and 54 will not be needed in applications where radar 10 represents a continuous wave radar rather than a pulsed radar.

Localizer 22 in this embodiment includes a phase shifter 56 and a phase shifter 58. Phase shifter 56 has an input coupled to the output of boxcar filter 52, and phase shifter 58 has an input coupled to the output of boxcar filter 54. An output of phase shifter 56 serves as the left audio output of localizer 22, and an output of phase shifter 58 serves as the right audio output of localizer 22.

The continous wave Doppler signals received at the inputs of localizer 22 exhibit 90° of relative phase shift. In one embodiment of the present invention, phase shifters 56 and 58 impart an additional 90° of relative phase shift to the Doppler signals before routing the Doppler signals to the left and right outputs of localizer 22. Thus, the left audio signal produced at the output of phase shifter 56 exhibits either 0° or 180° of phase shift relative to the right audio signal produced at the output of phase shifter 58.

Whether the audio signals exhibit 0° or 180° of mutual phase shift depends on whether the incoming Doppler signals' mutual phase difference is positive or negative. And, whether the incoming Doppler signals exhibit positive or negative phase difference depends on whether a target is approaching and causing a positive Doppler shift or receding and causing a negative Doppler shift.

Phase shifters 56 and 58 may advantageously impose opposing 45° phase shifts to produce the additional 90° phase shift. Alternatively, one of phase shifters 56 and 58 may impose a 90° phase shift while the other imposes 0° of phase shift.

In another embodiment of the present invention phase shifter 56 imposes 0° of phase shift, and phase shifter 58 also imposes 0° of phase shift. Thus, the left and right outputs of localizer 22 provide audio signals exhibiting ±90° of relative phase shift. Whether the audio signals exhibit a positive or negative 90° phase shift depends on whether a target is approaching or receding. In this embodiment localizer 22 contains only connections for coupling the outputs of boxcar filters 52 and 54 to an equalizer 62 and an equalizer 64, respectively.

Equalizer 62 has an input which couples to the left output of localizer 22 and an output that couples to the input of audio amplifier 26. Likewise, equalizer 64 has an input which couples to the right output of localizer 22 and an output that couples to the input of audio amplifier 28. As described above in connection with FIG. 1, the output of amplifier 26 couples to left speaker 32 of headset 34, and the output of amplifier 28 couples to right speaker 30 of headset 34. In addition, a volume and balance controller 66 couples to control inputs of amplifiers 26 and 28.

Equalizers 62 and 64 represent audio bandpass filters which impart an amplitude versus frequency characteristic of the left and right audio signals, respectively, providing an optimum target audibility for a given combination of expected Doppler frequencies, headset characteristics, and operator sensitivity. Amplifiers 26 and 28 provide the power required to drive speakers 32 and 30, under the control of volume and balance controller 66. Substantially no relative phase shift between the left and right audio signals output from localizer 22 occurs from operation of equalizers 62 and 64, amplifiers 26 and 28, or volume and balance controller 66.

Volume and balance controller 66 performs two functions. First, controller 66 allows adjustment of overall loudness of sounds emitted from both speakes 30 and 32. Second, controller 66 allows adjustment of the balance or relative loudness between the sounds emanating from speakers 30 and 32. Volume and balance controller 66 may advantageously be implemented using potentiometers.

Accordingly, left and right audio Doppler signals exhibiting a relative phase difference stimulate left and right speakers 32 and 30, respectively. In the embodiment mentioned above where left and right audio signals exhibiting either 0° or 180° of relative phase shift are produced by localizer 22, approaching targets appear to come from a signal central point between speakers 30 and 32 as perceived by target detector operator 68 (see FIG. 1). Receding targets cause a sound which appears to be dispersed in space due to the opposed phasing. However, an opposing convention occurs if in-phase and quadrature Doppler signals are reversed before being applied to localizer 22.

In the embodiment mentioned above where left and right audio signals exhibit ±90° of phase shift, approaching targets cause an auditory effect which appears to come from the left while receding targets appear to come from the right. An opposing convention results from reversing in-phase and quadrature Doppler signal connections or left and right audio signal connections.

Accordingly, FIG. 2 shows an embodiment of the present invention which exploits a person's ability to locate sounds in space by hearing sounds which exhibit a phase difference at the person's left and right ears. Since spatial variable is added to frequency and amplitude information of the tones which characterize a target, less operator concentration is required to operate the target detector.

Additionally, the phase differences caused by approaching and receding targets are produced by a coherent radar. Signals received by radar 10 which are not coherent with the coherent oscillation signal applied at terminal 38 will exhibit a random phase relationship relative to the in-phase and quadrature Doppler signals output by radar 10. Jamming signals represent such non-coherent signals. Thus, jamming signals will not cause the required phase differences which produce an auditory effect located at a particular place. Accordingly, jamming signals will appear to be dispersed in space and may thus be distinguished from valid target returns.

Further, the FIG. 2 embodiment of the present invention is readily adaptable to existing coherent radars using only a small amount of hardware. In particular, the embodiment of the present invention where localizer 22 produces audio signals having ±90° difference requires a minimal amount of hardware.

The foregoing description uses preferred embodiments to illustrate the present invention. However, those skilled in the art will recognize that changes and modifications may be made in these embodiments without departing from the scope of the present invention. For example, the above description uses the terms "left" and "right" only for the purpose of distinguishing differing items from each other. These terms are to be understood as being interchangeable. Additionally, several embodiments of localizer 22 in addition to boxcar filters, equalizers, amplifiers, and the like are described herein. Those skilled in the art are capable of arranging conventional electronic components to achieve the functions associated therewith without specific instruction. Further, those skilled in the radar arts will be able to adapt the teachings of the present invention to many different radar systems, including pulse compression radars. These and other changes and modifications obvious to those skilled in the art are intended to be included within the scope of this invention.

What is claimed is:

1. A target detector providing an auditory output for a target detector operator having left and right ears, said target detector comprising:
   a radar having an output which provides a Doppler signal;
   a localizer having an input coupled to said radar output and having left and right outputs, said localizer being for providing left and right audio signals;
   a left speaker coupled to the left output of said localizer; and
   a right speaker coupled to the right output of said localizer, said left and right speakers producing left and right sounds, respectively, when activated by the left and right audio signals, respectively, and said left and right sounds together causing an auditory effect perceivable as originating from a location having a predetermined relationship to the Doppler signal when heard by the left and right ears, respectively, of the target detector operator.

2. A target detector as claimed in claim 1 additionally comprising means, coupled to said localizer, for generating a reference signal having a parameter which exhibits a value having a predetermined relationship to the Doppler signal produced by said radar output when said radar operates with a stationary target.

3. A target detector as claimed in claim 1 additionally comprising:
   a left audio amplifier coupled between the left output of said localizer and said left speaker; and
   a right audio amplifier coupled between the right output of said localizer and said right speaker.

4. A target detector as claimed in claim 3 additionally comprising:
   a left audio frequency bandpass equalizer coupled between the left output of said localizer and said left audio amplifier; and
   a right audio frequency bandpass equalizer coupled between the right output of said localizer and said right audio amplifier.

5. A target detector as claimed in claim 3 additionally comprising means, coupled to said left amplifier and to said right amplifier, for controlling loudness of the left and right sounds produced by the left and right speakers, respectively.

6. A target detector as claimed in claim 3 additionally comprising means, coupled to said left amplifier and to said right amplifier, for controlling relative loudness between the left and right sounds produced by the left and right speakers, respectively.

7. A target detector as claimed in claim 1 additionally comprising means, coupled between said radar output and said localizer, for providing a continuous wave signal from the Doppler signal at said radar output.

8. A target detector as claimed in claim 1 wherein said localizer comprises means for producing an auditory effect perceivable by the target detector operator as being located toward one of said left and right speakers when objects are approaching the target.

9. A target detector as claimed in claim 8 wherein said localizer comprises means for producing an auditory effect perceivable by the target detector operator as being located toward the other of said elft and right speakers when objects are receding from the target detector.

10. A target detector as claimed in claim 1 wherein said localizer comprises means for producing an auditory effect perceivable by the target detector operator as being located at a central point between said left and right speakers in response to a first one of an approaching and a receding target.

11. A target detector as claimed in claim 10 wherein said localizer comprises means for producing an auditory effect perceivable by the target detector operator as being dispersed in space between said left and right speakers in response to a second one of an approaching and a receding target.

12. A target detector as claimed in claim 1 where said radar represents a coherent radar comprising a second output, said radar output and second output providing in-phase and quadrature Doppler signals, respectively, and said radar second output being coupled to said localizer.

13. A target detector as claimed in claim 12 wherein said localizer comprises means for coupling the in-phase and quadrature Doppler signals provided by said coherent radar to the left and right outputs, respectively, of said localizer while preserving phase differences between the in-phase and quadrature Doppler signals.

14. A target detector as claimed in claim 12 wherein said localizer comprises means for coupling the in-phase and quadrature Doppler signals provided by said coherent radar to the left and right outputs, respectively, of said localizer while adding 90° of phase difference to existing phase differences between the in-phase and quadrature Doppler signals.

15. A method of indicating target movement to a target detector operator having left and right ears, the method comprising the steps of:

provic a single Doppler signal at a radar output; and stimulating an audio headset having left and right speakers with the Doppler signal so that the left speaker produces a left sound and the right speaker produces a right sound, the left and right sounds together causing an auditory effect perceivable as originating from a location having a predetermined relationship to the single Doppler signal when heard at the left and right ears, respectively of the target detector operator.

16. A method as claimed in claim 15 wherein said stimulating step comprises the step of localizing an origin of the auditory effect so that objects approaching the radar of said providing step cause the auditory effect to be perceived by the target detector operator as being located toward one of the left and right speakers of the headset.

17. A method as claimed in claim 15 wherein the radar output of said providing step is an output from a coherent radar, said providing step provides in-phase and quadrature Doppler signals exhibiting a relative phase relationship, and said stimulating step includes the steps of:

routing the in-phase Doppler signal to a first one of the left and right speakers; and routing the quadrature Doppler signal to a second one of the left and right speakers, said routing the in-phase signal step and said routing the quadrature signal step together preserving the phase relationship between the in-phase and quadrature Doppler signals.

18. A method as claimed in claim 15 wherein the radar output of said providing step is an output from a coherent radar, said providing step provides in-phase and quadrature Doppler signals exhibiting a relative phase relationship, and said stimulating step includes the steps of:

routing the in-phase Doppler signal to a first one of the left and right speakers; and routing the quadrature Doppler signal to a second one of the left and right speakers, said routing the in-phase signal step and said routing the quadrature signal step together adding 90° of phase difference to the relative phase relationship between the in-phase and quadrature Doppler signals.

19. A target detector providing an auditory output, said target detector comprising:

a radar having an output which provides a Doppler signal;

a localizer having an input coupled to said radar output and having left and right outputs, said localizer being for providing left and right audio signals exhibiting a relative phase difference therebetween;

a left speaker coupled to the left output of said localizer; and a right speaker coupled to the right output of said localizer, said left and right speakers producing left and right sounds, respectively, when activated by the left and right audio signals, respectively.

* * * * *